Dec. 30, 1924.  
M. P. HOLMES  
MINING APPARATUS  
Filed May 1, 1922  
1,521,023
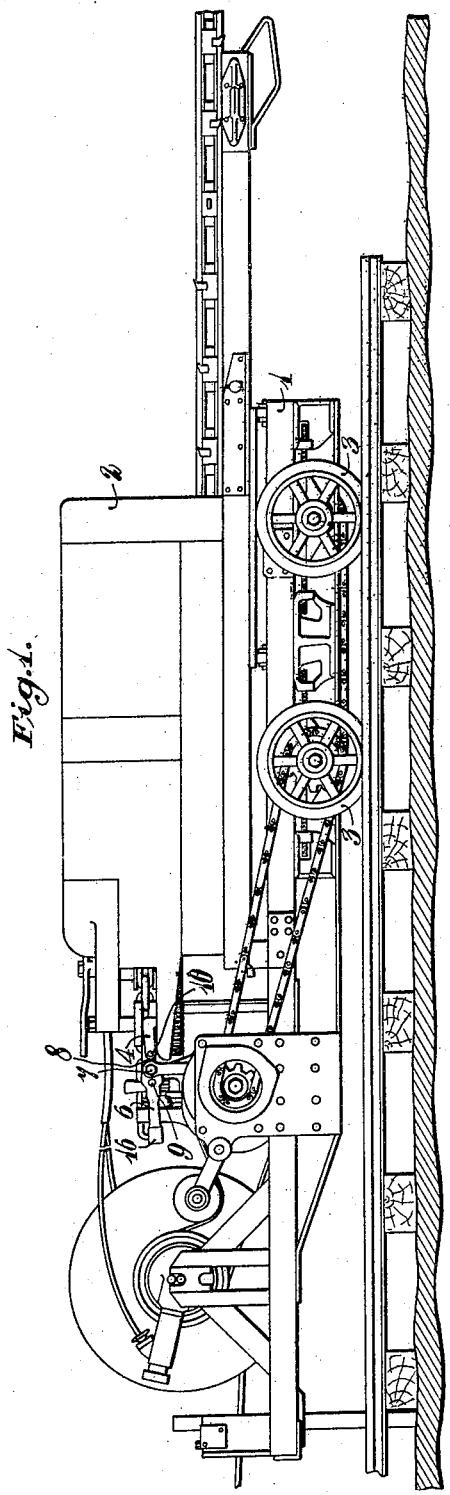
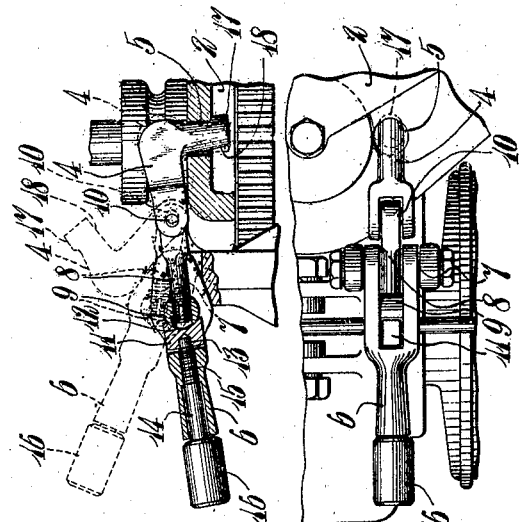
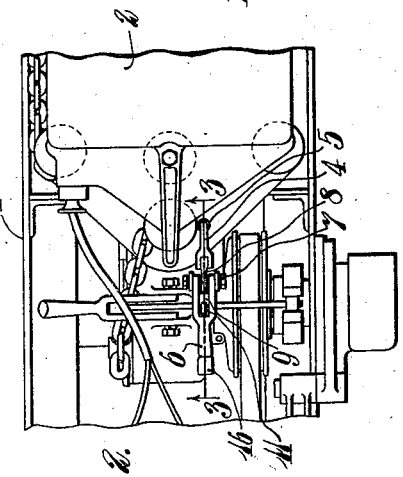
Inventor:
Morris P. Holmes
by
atty.

Patented Dec. 30, 1924.

1,521,023

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

MINING APPARATUS.

Application filed May 1, 1922. Serial No. 557,660.

*To all whom it may concern:*

Be it known that I, MORRIS P. HOLMES, a citizen of the United States, residing at Claremont, in the county of Sullivan and State of New Hampshire, have invented certain new and useful Improvements in Mining Apparatus, of which the following is a full, clear, and exact specification.

My invention relates a mining apparatus. It has for its object to provide improved means for locking a movable element of such apparatus to a fixed element thereof wherein the locking mechanism may be held in any desired position regardless of vibration, and readily released whenever desired. A further object of my invention is to provide an improved, simple and conveniently operated controlling mechanism for the machine locking mechanism of a mining machine whereby the machine may be connected to its truck and the locking mechanism held in locking position despite the vibration of the parts, in such manner as to insure a proper drive between the truck driving elements on the machine and truck.

In the accompanying drawings I have shown for purpose of illustration one embodiment which my invention may assume in practice.

In these drawings,—

Fig. 1 is a side elevation of a mining apparatus equipped with my improvement, the mining machine being shown locked in transport position on its truck.

Fig. 2 is a plan view of a portion of the rear end of the machine and the truck.

Fig. 3 is an enlarged sectional view on line 3—3 of Fig. 2.

Fig. 4 is an enlarged plan view of the mechanism shown in Fig. 3.

In this illustrative construction I have shown a mining machine truck 1 of any suitable construction carrying a mining machine 2, the truck wheels 3 being driven from the mining machine through a usual truck driving mechanism, comprising meshing gears on the machine and truck, when the machine is in transport position on the truck, and the machine being held in proper truck driving position by a locking member 4 extending through an opening 5 in the rear end of the machine frame and being secured in locking position and released by a toggle operating member 6 having a bifurcated end pivoted on a transverse axis 7 on the truck in rear of the member 4 and connected to that member through a connecting toggle link 8 adjustably connected as by threading and pivoted to a transverse pivot member 9 in the bifurcated portion of the member 6 and at its front end pivoted at 10 to the rear end of the member 4. The toggle operated means per se for holding the machine on the truck forms the subject matter of my copending application, Ser. No. 385,650, filed June 1, 1920.

In my improved construction it will be noted that the rear end of the link 8 which is adjustably connected by threading it in its pivot member 9 has a member 11 disposed in rear thereof having a concave surface 12 adapted to engage the surface of the pivot 9. As shown, this member 11 is disposed between the member 6 and the member 9 and has a suitable socket in its rear face adapted to receive an extension 13 of reduced cross section and herein having an unthreaded periphery, on a rotatable member 14 threaded as at 15 in the front end of the member 6, and having on its rear end a knob or rotating portion 16 forming an extension of the rear end of the member 6. Attention is here also directed to the fact that the member 4 is herein provided with a forwardly extending lug 17 on its front end adapted to underlie the front wall of the opening 5 in the machine frame, while its rear end has no such projection and instead is slightly inclined as at 18.

In the use of my improved construction it will be noted that when the parts are in the full line position shown in Fig. 3, the machine is securely locked to the truck due not only to the extension of the projection 17 under the front edge of the opening 5 and to the disposition of the pivots 9 and 10 relative to the pivot 8, but also to the action of the member 11 which upon rotation of the portion 16 of the member 14 has its surface 12 clamped against the surface of the pivot member 9. When it is desired to release the locking mechanism, by simply rotating the portion 16 the member 11 is correspondingly released so that the member 6 may move freely upward when desired, as to the dotted line position of the latter illustrated in Fig. 3, and by thus moving the pivot 10 relative to the aperture 5, move the member 4 from the full line position shown in Fig. 3 to the lower dotted line position illustrated therein, wherein the projection 17 disengages the edge of the opening 5 and the member 4 may be pulled out of the member 5 by hand into the upper angularly disposed dotted line position shown, and thus permit movement of the machine 2 relative to the truck 1.

As a result of my improvement it will be noted that it is possible by a simple rotation of the member 16 to hold the member 4 securely in position in the aperture 5 through holding the parts connected to the member 4 against movement from locking position even when subjected to the most severe vibration. Further, it will be evident that this member 16 is so disposed relative to the member 6 as to permit it to be conveniently operated while the operator's hand is still on the latter and that the member 16 is adapted normally to form a part of the member 6, increasing the leverage of the latter without unduly increasing the length of the same. It will of course be understood that through the treading of the member 8 to its pivot member it is made possible to adapt the mechanism to use with apertures 5 differently located relative to the other parts.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an apparatus including a fixed and a movable element, toggle mechanism for locking the elements together including an operating handle, and means for frictionally holding said handle in adjusted position.

2. In an apparatus including a fixed and a movable element, toggle mechanism for locking the elements together including an operating handle and a toggle element adjustable relative thereto, and means carried by said operating handle for holding the same in adjusted position.

3. In an apparatus including a fixed and a movable element, toggle mechanism for locking the elements together including an operating handle, and means including an adjustable member carried by said operating handle for holding said handle in adjusted position.

4. In an apparatus including a fixed and a movable element, toggle mechanism for locking the elements together including an operating handle, and means including a clamping member and a rotatable adjusting member therefor adjustable longitudinally of said handle for holding the latter in adjusted position.

5. A locking mechanism for apparatus comprising a locking member engageable with a part of said apparatus, an operating handle therefor carried on a fixed support, interconnected toggle forming mechanism between said elements, and holding means for said toggle mechanism acting on one of the pivots thereof.

6. A locking mechanism for apparatus comprising a locking member engageable with a part of said apparatus, an operating handle therefor carried on a fixed support, interconnected toggle forming mechanism between said elements, and holding means for said toggle mechanism acting on one of the pivots thereof and adjustable longitudinally of said handle.

7. A locking mechanism for apparatus comprising a locking member engageable with a part of said apparatus, an operating handle therefor carried on a fixed support, interconnected toggle forming mechanism between said elements, and holding means for said toggle mechanism including a clamping member and a rotatable member therefor adjustable longitudinally of said handle.

8. A toggle operating mechanism for locking a machine to its truck comprising a locking member, an operating handle therefor, toggle forming connections between the same, and means for holding said handle in toggle locking position including a rotatable member forming an extension of said handle.

9. A toggle operated mechanism for locking a machine to its truck comprising a locking member, an operating handle therefor, toggle forming connections between the same, and means for holding said toggle in locked position including a rotatable member forming an extension of said handle and threaded in the latter, and a cooperating member engaging said member and one of the toggle pivots.

10. A toggle operated mechanism for locking a machine to its truck comprising a toggle operated member carried on a truck and having a hook adapted to be received in an opening in a machine, an operating handle, a connecting toggle link adjustable as to length to vary the position of said hook, and means carried by said operating member for frictionally holding the latter in operative position.

11. A toggle operated mechanism for locking a machine to its truck comprising a hook adapted to be received in an opening in a machine, said hook having a forwardly projecting extension on its front end, and mechanism for changing the angular position of said hook relative to the opening in the machine operative in one position to lock said hook in said opening.

12. A toggle operated mechanism for locking a machine to its truck comprising a hook adapted to be received in an opening in a machine, said hook having a forwardly projecting extension on its front end, mechanism for changing the angular disposition of said hook relative to the opening in the machine operative in one position to lock said hook in said opening, and toggle mechanism for locking said hook in said opening comprising an adjustably connected toggle link and an operating handle also having provision for locking the parts together.

13. In an apparatus including a fixed and a movable element, toggle mechanism for locking the elements together including an operating handle, a pivoted nut carried thereby, a toggle member threaded therein and engageable with said movable element, and means carried by said operating handle and frictionally engaging said nut for locking the former in operative position.

14. In an apparatus including a fixed and a movable element, means for locking said elements together including an operating handle pivoted on said stationary element, a pivoted nut carried thereby, a toggle member carried by said nut and engageable with said movable element, and means frictionally engageable with said nut for maintaining the parts in operative position.

15. In an apparatus including a fixed and a movable element, means for locking said elements in fixed spaced relation including an operating handle pivoted on said stationary element, a nut carried thereby, a toggle member carried by said nut and engageable with said movable element, and means for holding said operating handle in operative position including an adjustable member engageable with said nut.

16. In an apparatus including a fixed and a movable element, means for locking said elements in fixed spaced relation including an operating handle pivoted on said stationary member, a nut carried thereby, a toggle member carried by said nut having an element pivoted thereon engageable with said movable element, and means disposed coaxially through said operating handle for maintaining said locking means in operative position.

17. A toggle operated mechanism for locking a machine to its truck comprising a toggle operated member carried on a truck and having a hook pivoted thereon adapted to be received in an opening in a machine, an operating handle, a connecting toggle link adjustable as to length to vary the position of said hook, and means for maintaining said toggle mechanism in operative position.

In testimony whereof I affix my signature.
MORRIS P. HOLMES.